(12) United States Patent
Liao et al.

(10) Patent No.: US 11,811,092 B2
(45) Date of Patent: Nov. 7, 2023

(54) CERAMIC-AND-POLYMER-COMPOSITELY-COATED LITHIUM ION SEPARATOR AND PREPARATION METHOD THEREFOR

(71) Applicant: Shenzhen Senior Technology Material Co., Ltd., Guangdong (CN)

(72) Inventors: Peilong Liao, Guangdong (CN); Xiang Ping, Guangdong (CN); Yongqiang Yao, Guangdong (CN); Liuhao Zhang, Guangdong (CN); Liang Chen, Guangdong (CN)

(73) Assignee: Shenzhen Senior Technology Material Co., Ltd., Guangdong (CN)

( * ) Notice: Subject to any disclaimer, the term of this patent is extended or adjusted under 35 U.S.C. 154(b) by 202 days.

(21) Appl. No.: 16/078,188

(22) PCT Filed: Dec. 29, 2017

(86) PCT No.: PCT/CN2017/120056
§ 371 (c)(1),
(2) Date: Mar. 27, 2019

(87) PCT Pub. No.: WO2018/233269
PCT Pub. Date: Dec. 27, 2018

(65) Prior Publication Data
US 2019/0245182 A1 Aug. 8, 2019

(30) Foreign Application Priority Data
Jun. 20, 2017 (CN) .......................... 201710470496.2

(51) Int. Cl.
*H01M 50/489* (2021.01)
*H01M 10/42* (2006.01)
(Continued)

(52) U.S. Cl.
CPC ..... *H01M 50/489* (2021.01); *H01M 10/4235* (2013.01); *H01M 50/403* (2021.01);
(Continued)

(58) Field of Classification Search
None
See application file for complete search history.

(56) References Cited

U.S. PATENT DOCUMENTS

2007/0281206 A1  12/2007  Fujikawa et al.
2009/0246640 A1*  10/2009  Bak .................. H01M 50/46
                                                            429/246
(Continued)

FOREIGN PATENT DOCUMENTS

CN  101326658 A  12/2008
CN  104157818 A  11/2014
(Continued)

*Primary Examiner* — Jonathan G Leong
*Assistant Examiner* — Tony S Chuo
(74) *Attorney, Agent, or Firm* — Meunier Carlin & Curfman LLC (57) ABSTRACT

Disclosed are a ceramic and polymer compositely coated lithium ion separator and a preparation method therefor. The ceramic and polymer compositely coated lithium ion separator comprises a polyolefin porous membrane, a ceramic coating coated onto one or both sides of a membrane surface, and a polymer coating coated onto a ceramic surface or the membrane surface. The composite separator prepared in the present disclosure significantly enhances heat resistance of the separator and bonding strength thereof with positive and negative pole pieces, improves the wettability of an electrolyte, can effectively prevent an internal short circuit due to layer dislocation between the separator and the electrodes, and also improves hardness and safety performance of the battery. Further disclosed is a method for preparing the ceramic and polymer compositely coated lithium ion separator, which method enables the preparation of a separator having even coating thickness of the ceramic (Continued)

coating and the polymer coating and good uniformity, and is favorable for continuous and large-scale production.

18 Claims, 5 Drawing Sheets

(51) Int. Cl.
    *H01M 50/403*     (2021.01)
    *H01M 50/491*     (2021.01)
    *H01M 50/417*     (2021.01)
    *H01M 50/434*     (2021.01)
    *H01M 50/457*     (2021.01)
    *H01M 50/451*     (2021.01)

(52) U.S. Cl.
    CPC ....... *H01M 50/417* (2021.01); *H01M 50/434* (2021.01); *H01M 50/451* (2021.01); *H01M 50/457* (2021.01); *H01M 50/491* (2021.01)

(56) References Cited

U.S. PATENT DOCUMENTS

2013/0273408 A1* 10/2013 Yoshitomi ............ H01M 50/411 429/144
2015/0240039 A1* 8/2015 Katsuda ................ H01G 11/06 429/214
2015/0372277 A1* 12/2015 Honda .................. H01M 50/40 429/145
2017/0170440 A1* 6/2017 Cao ...................... H01M 50/446
2019/0207190 A1* 7/2019 Hu ....................... H01M 50/431
2020/0335759 A1* 10/2020 Lane .................... C09D 131/04

FOREIGN PATENT DOCUMENTS

| | | | | |
|---|---|---|---|---|
| CN | 104157818 A | † | 11/2014 | |
| CN | 104157819 A | | 11/2014 | |
| CN | 104393215 A | | 3/2015 | |
| CN | 104446515 A | | 3/2015 | |
| CN | 106654119 A | * | 5/2017 | ............ H01G 11/52 |
| CN | 106654119 A | | 5/2017 | |
| CN | 106784533 A | † | 5/2017 | |
| CN | 107275550 A | | 10/2017 | |
| JP | 2003007279 A | * | 1/2003 | ......... H01M 10/052 |
| JP | 5226744 B2 | † | 7/2013 | |
| KR | 20160059013 A | * | 5/2016 | ......... H01M 10/052 |
| KR | 20160125921 A | † | 11/2016 | |

\* cited by examiner
† cited by third party

| items | unit | embodiment 1 | embodiment 2 | embodiment 3 | embodiment 4 | comparative embodiment 1 | comparative embodiment 2 |
|---|---|---|---|---|---|---|---|
| base membrane | | PE:12um | PP:16um | PE and PP composite three-layered membrane: 20um | PE and PP composite three-layered membrane: 16um | PE:12um | PP:16um |
| coating thickness | um | 6.4 | 5.1 | 4.7 | 5.3 | — | — |
| composite separator thickness | | 18.4 | 21.1 | 24.7 | 21.3 | — | — |
| coating surface density | g/m² | 7.9 | 6.9 | 5.5 | 6.3 | — | — |
| composite separator surface density | | 14.2 | 17.4 | 17.2 | 16.8 | — | — |
| heat shrinkage (105°C,1H) MD | % | 0.64 | 0.68 | 0.81 | 0.72 | 2.34 | 1.34 |
| heat shrinkage (105°C,1H) TD | | 0.04 | 0 | 0 | 0 | 0.3 | 0 |
| heat shrinkage (130°C,1H) MD | % | 1.93 | 1.14 | 1.62 | 1.35 | 8.72 | 3.86 |
| heat shrinkage (130°C,1H) TD | | 0.88 | 0.27 | 0.83 | 0.74 | 5.01 | 0.70 |
| bonding strength between coating and pole pieces | N/M | 45.3 | 42.9 | 39.6 | 48.7 | 0 | 0 |

CERAMIC-AND-POLYMER-COMPOSITELY-COATED LITHIUM ION SEPARATOR AND PREPARATION METHOD THEREFOR

CROSS-REFERENCE TO RELATED APPLICATIONS

Priority

This application is a U.S national application of the international application number PCT/CN2017/120056 filed on Dec. 29, 2017 and claiming priority of Chinese national application No. 201710470496.2 filed on Jun. 20, 2017 the contents of all of which are incorporated herein by reference.

TECHNICAL FIELD

The present disclosure relates to a lithium ion battery separator, and particularly to a ceramic-and-polymer-compositely-coated lithium ion separator having good heat shrinkage performance and strong bonding force with a pole piece and allowing for mass production, and a preparation method therefor.

BACKGROUND ART

With the rapid development of electric automobiles in recent years, the market scale of the power batteries required by the electric automobiles increases sharply, and the safety of the power batteries also becomes a focus of public concern. According to incomplete statistics, in the first half of 2016 alone, there were totally 11 fire accidents in electric automobiles, of which one was caused by a short circuit in the battery. It has become the industry consensus to eliminate the potential risks of the power batteries and improve the safety of the power batteries.

As one of the four major materials of a lithium battery, a separator is generally made of polyolefin-based porous membrane. During the charging and discharging process of a lithium battery, a battery separator mainly serves the function of separating the positive electrode from the negative electrode to avoid the short circuit of the battery, ensuring the passage of $Li^+$, and ensuring a smooth circuit inside the battery. Since the existing polyolefin-based porous membranes generally have a melting point of lower than 200° C., when the battery experiences thermal runaway due to collision, over-charging, etc., the separator will shrink or melt, which will cause direct contact between the positive electrode and the negative electrode, leading to a short circuit of the battery, thereby causing accidents such as battery fire.

In order to avoid short circuit of the battery caused by shrinkage or melting of the separator, the general practice is to coat the separator with a ceramic layer to reduce the degree of heat shrinkage of the separator and improve the mechanical strength of the separator, thereby reducing the probability of short circuit in the battery caused by shrinkage or melting of the separator due to thermal runaway, piercing of the separator by lithium dendrites, etc. in the battery. However, merely coating the separator with a ceramic layer cannot meet the higher requirements raised by today's battery industry upon separators, i.e., 1) high bonding strength between the separator and the positive and negative pole pieces, and good interfacial compatibility; and 2) excellent electrochemical performance of the coating, and high ion conductivity.

Therefore, there is a need for a high-safety separator for a battery that has high bonding strength and can reduce the probability of short circuit in the battery.

SUMMARY

One of the objects of the present disclosure is to provide a ceramic-and-polymer-compositely-coated lithium ion separator, which has the advantages of high bonding strength with a battery pole piece and high heat shrinkage performance, and can effectively avoid short circuit caused by dislocation with respect to the battery pole piece.

The other object of the present disclosure is to provide a method for manufacturing the ceramic-and-polymer-compositely-coated lithium ion separator, which is advantageous for continuous and large-scale production.

In order to achieve at least one of the above objects, the technical solution adopted in the present disclosure is as follows:

a ceramic-and-polymer-compositely-coated lithium ion separator, comprising a polyolefin porous membrane, a ceramic coating coated onto one or both sides of a membrane surface, and a polymer coating coated onto the ceramic surface or the membrane surface.

Optionally, the polyolefin porous membrane is one selected from the group consisting of a dry method PP membrane, a wet method PE membrane and a PE and PP composite three-layered membrane; preferably, the polyolefin porous membrane has a thickness of 2-50 μm; and more preferably, the polyolefin porous membrane has a porosity of 20%-70%.

Optionally, the ceramic coating has a thickness of 1-10 μm; and preferably, the polymer coating has a thickness of 0.5-8 μm.

Optionally, the total coating thickness of the ceramic coating and the polymer coating is 1.5-18 μm; preferably, the total coating surface density of the ceramic coating and the polymer coating is 3-15 g/m$^2$; more preferably, the total thickness of the compositely coated lithium ion separator is 3.5-68 μm; and further preferably, the total surface density of the compositely coated lithium ion separator is 3-50 g/m$^2$.

Optionally, the ceramic coating is made by the following raw materials in parts by weight: 15-45 parts of a ceramic material, 0.5-8 parts of an aqueous dispersant, 1-10 parts of an aqueous binder, 1-5 parts of an aqueous binder emulsion, and 0.1-5 parts of an aqueous wetting agent.

Optionally, the ceramic material is at least one selected from the group consisting of aluminum oxide, silicon dioxide, magnesium hydroxide, rutile titanium dioxide, magnesium oxide, boehmite, zirconium dioxide, barium titanate and zinc oxide; preferably, the D50 of particles of the ceramic material is 20-2000 nm; and more preferably, the specific surface area of the ceramic material is 0.8-200 m$^2$/g.

Optionally, the aqueous binder is at least one selected from the group consisting of polyvinylidene fluoride, polyvinyl alcohol, styrene-butadiene rubber, sodium carboxymethyl cellulose, styrene-acrylic latex, pure styrene latex, sodium alginate and polyacrylic acid; preferably, the aqueous dispersant is at least one selected from the group consisting of sodium polyacrylate, polyethylene glycol, sodium dodecyl sulfate, carboxylate fluorine dispersants, sodium dibutylnaphthalenesulfonate, sulfonate fluorine dispersants, potassium polyacrylate, polyacrylamide, polyethylene glycol fatty acid ester and sodium carboxymethyl cellulose; and more preferably, the aqueous wetting agent is at least one selected from the group consisting of sodium polyacrylate, polyvinyl alcohol, sodium alkyl polyoxyethylene ether carboxylate, alkylphenol polyoxyethylene ether, sodium alkyl benzenesulfonate, alkylphenol polyoxyethylene ether, polyoxyethylene alkyl amine and polyoxyethylene amide.

Optionally, the aqueous binder emulsion is composed of the following raw materials in parts by weight: 1-10 parts of sodium carboxymethyl cellulose, 0-5 parts of a high dielectric constant ceramic material, 5-20 parts of a monomer for synthesis of acrylic resin, 0.1-0.5 parts of ammonium persulfate, and 0.2-2 parts of a surfactant.

Optionally, the high dielectric constant ceramic material is at least one selected from the group consisting of rutile titanium dioxide, barium titanate, $BaTiO_3$—$Nb_2O_5$-$MO_x$ (wherein M=Co, Ni, Mn, Zn), potassium niobate and sodium niobate; preferably, the surfactant is at least one selected from the group consisting of carboxylate, sodium benzenesulfonate, sodium dodecylbenzene sulfonate, sodium fatty alcohol polyoxyethylene ether sulfate, Triton X-100, quaternary ammonium salts, lauryl glucoside, sodium dodecyl sulfate and betaine salts; and more preferably, the monomer for synthesis of acrylic resin is at least one selected from the group consisting of methyl acrylate, ethyl acrylate, butyl acrylate, methyl methacrylate, butyl methacrylate, 2-ethylhexyl acrylate, ethyl methacrylate, acrylic acid, hydroxyethyl methacrylate, hydroxyethyl acrylate, N-hydroxymethyl acrylamide, hydroxypropyl acrylate, glycidyl acrylate, methacrylic acid, hydroxypropyl methacrylate and glycidyl methacrylate.

Optionally, the polymer coating is made of the following raw materials in parts by weight: 0-5 parts of a high dielectric constant ceramic material, 0-2 parts of a binder, 3-20 parts of a polymer, 2-20 parts of a pore-forming agent, 0-5 parts of a dispersant and 48-92 parts of a solvent.

Optionally, the polymer is at least one selected from the group consisting of a PVDF homopolymer, a copolymer of PVDF and hexafluoropropylene, polyacrylonitrile, polyoxyethylene and polymethacrylate; preferably, the polymer has a molecular weight of 50000-1200000; more preferably, the pore-forming agent is at least one selected from the group consisting of polyethylene glycol, polyvinylpyrrolidone, pure water, acetone, methyl acetate, methanol, isopropanol, ethanol, methanoic acid, acetic acid, propionic acid, n-butyl alcohol, n-octyl alcohol, lauryl alcohol, lithium chloride and lithium perchlorate; further preferably, the solvent is at least one selected from the group consisting of dimethyl acetamide, dichloroethane, dimethylformamide, trichloroethane, sulfolane, dimethyl sulfoxide, N-methylpyrrolidone, chloroform, dichloromethane and acetone; still further preferably, the binder is at least one selected from the group consisting of polyvinylidene fluoride, polyvinyl alcohol, styrene-butadiene rubber, sodium carboxymethyl cellulose, styrene-acrylic latex, pure styrene latex, sodium alginate and polyacrylic acid; and still further preferably, the dispersant is at least one selected from the group consisting of sodium polyacrylate, polyethylene glycol, sodium dodecyl sulfate, carboxylate fluorine dispersants, sodium dibutylnaphthalenesulfonate, sulfonate fluorine dispersants, potassium polyacrylate, polyacrylamide, polyethylene glycol fatty acid ester and sodium carboxymethyl cellulose.

An embodiment of the present disclosure further provides a method for preparing a ceramic-and-polymer-compositely-coated lithium ion separator, comprising the steps of:

(1) coating an aqueous ceramic slurry I onto one or both sides of a dry method PP membrane, a wet method PE membrane or a PE and PP composite three-layered membrane, and drying the same to obtain a ceramic coated membrane; and (2) coating a polymer slurry III onto both sides of the ceramic coated membrane, subjecting the same to solidification, water washing and polymer pore-forming, and then drying the same.

Optionally, a method for preparing the aqueous ceramic slurry I is as follows: mixing 15-45 parts by weight of a ceramic material, 0.5-8 parts by weight of an aqueous dispersant, 1-10 parts by weight of an aqueous binder, 1-5 parts by weight of an aqueous binder emulsion, 0.1-5 parts by weight of an aqueous wetting agent and pure water, subjecting the mixture to pre-dispersion by a ball mill and dispersion by a high-speed disperser, and then filtering the same with a 200-500 mesh sieves.

Optionally, a method for preparing the aqueous binder emulsion comprises the steps of:

(1) adding 1-10 parts by weight of sodium carboxymethyl cellulose to deionized water having a weight that is 5-20 times the weight of sodium carboxymethyl cellulose, and stirring the same evenly to obtain a sodium carboxymethyl cellulose aqueous solution;

(2) adding 0-5 parts by weight of a high dielectric constant ceramic material, 0.1-1 parts by weight of a surfactant and 8-30% of the total weight of the sodium carboxymethyl cellulose aqueous solution, which serve as a first input material, into to deionized water having a weight that is 5-20 times the weight of the first input material, and stirring to disperse the same to obtain solution A;

(3) adding 5-20 parts by weight of a monomer for synthesis of acrylic resin and 0.1-1 parts by weight of a surfactant, which serve as a second input material, into deionized water having a weight that is 5-20 times the weight of the second input material, and stirring to disperse the same evenly to obtain solution B; and (4) heating solution A to 60-80° C., adding thereto 0.1-0.5 parts by weight of ammonium persulfate, introducing thereto a protective gas, dropwise adding solution B to solution A while stirring, stirring for 10-60 min with the temperature maintained, discharging the resultant product, cooling the same to normal temperature, and mixing, while stirring evenly, the same with 70-92% of the total weight of the sodium carboxymethyl cellulose aqueous solution.

Optionally, in step (2), the stirring to disperse is stirring at 2000-3500 R/min for 30-60 min; and preferably, in step (4), the dropwise addition of solution B to solution A is finished within 10-60 min.

Optionally, a method for preparing the polymer slurry III is as follows: mixing, while stirring, 2-20 parts by weight of a pore-forming agent, 0-2 parts by weight of a binder, 0-5 parts by weight of a dispersant and 48-92 parts by weight of a solvent to obtain mixed solution II; mixing 3-20 parts by weight of a polymer with 0-5 parts by weight of a high dielectric constant ceramic material and then adding the same to the mixed solution II, and thereafter sequentially subjecting the resultant solution to pre-dispersion by a ball mill and dispersion by a high-speed disperser.

Optionally, the mixing while stirring is stirring at a rotational speed of 500-5000 R/min for 0.2-1.2 h.

Optionally, the pre-dispersion by a ball mill is stirring for 0.1-1.5 h in a ball mill having a rotational speed of 200-2500 R/min; and preferably, the dispersion by a high-speed disperser is high-speed stirring at a rotational speed of 500-9000 R/min for 0.3-2 h.

Optionally, the coating is carried out by a coater at a coating speed of 25-85 m/min; preferably, the coating is one selected from the group consisting of dip coating, slide coating, curtain coating, microgravure coating and spray coating; more preferably, the drying is drying at a temperature of 35-78° C.; further preferably, the solidification refers to passing through a solidification tank containing 60-100 wt % of pure water and 0-40 wt % of an alcohol, wherein the alcohol is at least one selected from the group consisting of ethanol, methanol, isopropanol and ethylene glycol; and still further preferably, the water washing refers to passing through a washing tank containing pure water.

Compared with the prior art, the present disclosure has the following advantageous effects;

The ceramic-and-polymer-compositely-coated lithium ion separator provided by the present disclosure is prepared by coating a ceramic coating and then a polymer coating onto the surface of a membrane, which has the advantages of high heat resistance performance and high bonding strength with the positive and negative pole pieces, and can also improve the wettability of an electrolyte, prevent an internal short circuit due to layer dislocation between the composite separator and the electrodes and improve hardness and safety performance of the battery. In addition, in the present disclosure, a high dielectric constant ceramic material is innovatively added to the polymer coating, which greatly improves the $Li^+$ ion conductivity of the polymer coating, thereby improving the charging and discharging performance of the battery using the composite separator. The method for preparing a ceramic-and-polymer-compositely-coated lithium ion separator provided by the present disclosure is favorable for continuous and large-scale production.

DETAILED DESCRIPTION OF EMBODIMENTS

The present disclosure is further described below in connection with specific embodiments and the accompanying drawings, but the scope of protection of the present disclosure is not merely limited to the contents described in the embodiments.

In the raw materials used in the present disclosure, the PP membrane is the abbreviation of polypropylene membrane, the PE membrane is the abbreviation of polyethylene membrane, pure water is deionized water, Triton is the product name of polyoxyethylene-8-octyl phenyl ether, and PVDF is the abbreviation of polyvinylidene fluoride.

Embodiment 1

The present embodiment provides a ceramic-and-polymer-compositely-coated lithium ion separator, and the preparation method thereof is as follow:

(1) preparation of an aqueous binder emulsion:

1) adding 5 parts of sodium carboxymethyl cellulose to deionized water having a weight that is 8 times the weight of sodium carboxymethyl cellulose, and stirring the same evenly to obtain a sodium carboxymethyl cellulose aqueous solution;

2) adding 1.5 parts of barium titanate powder, 0.5 parts of sodium dodecylbenzene sulfonate, and 22% of the total weight of the sodium carboxymethyl cellulose aqueous solution, which serve as a first input material, into deionized water having a weight that is 6 times the weight of the first input material, and stirring to disperse the same at a high speed of 2500 R/min for 60 min to obtain solution A;

3) adding 8 parts of butyl acrylate, 8 parts of methyl methacrylate, 0.2 parts of Triton X-100, and 0.2 parts of sodium dodecylbenzene sulfonate, which serve as a second input material, into deionized water having a weight that is 16 times the weight of the second input material, and stirring to evenly disperse the same to obtain solution B; and 4) heating solution A in a reactor to 80° C., adding thereto 0.25 parts of ammonium persulfate, introducing thereto a protective gas, dropwise adding solution B to solution A while stirring in such a manner that dropwise addition of solution B to solution A is finished within 30 min, stirring for 50 min with the temperature maintained, discharging the resultant product, cooling the same to normal temperature, and mixing, while stirring evenly, the same with 78% of the total weight of the sodium carboxymethyl cellulose aqueous solution, obtaining the aqueous binder emulsion.

(2) adding 27 parts of aluminum oxide (with D50 of 0.91 μm and a specific surface area of 4.87 $m^2/g$), 4.5 parts of the aqueous binder emulsion, 2.8 parts of polyvinyl alcohol, 3.7 parts of styrene-butadiene rubber, 0.85 parts of the aqueous wetting agent sodium alkyl polyoxyethylene ether carboxylate and 59.15 parts of pure water into a dispersion tank, ball-milling the same for 40 min in a ball mill at a rotational speed of 800 R/min for pre-dispersion, after the pre-dispersion is finished, pumping the same into a high-speed disperser for stirring for 100 min at a rotational speed of 6000 R/min, then pouring the resultant slurry into a plastic bucket, and filtering the same with a 400 mesh sieve, to obtain aqueous ceramic slurry I;

(3) placing 6 parts of pure water, 10 parts of isopropyl alcohol, 1.8 parts of a carboxylate fluorine dispersant, and 68 parts of NMP in an agitation tank, and stirring the same at 2500 R/min for 0.5 h to obtain mixed solution II;

(4) placing 14 parts of a copolymer P (VDF-HFP) powder of PVDF and hexafluoropropylene (HFP), 0.2 parts of rutile titanium dioxide powder (with D50 of 25 μm) in a dispersion tank, adding the mixed solution II thereto, ball-milling the same for 30 min in the ball mill at a rotational speed of 800 R/min for pre-dispersion, and after the pre-dispersion is finished, pumping the same into a high-speed disperser for stirring for 40 min at a rotational speed of 3500 R/min, to obtain polymer slurry III;

(5) coating the aqueous ceramic slurry III onto one side of a 12 μm wet method PE membrane by a large coater, using the coating method of microgravure coating at a coating speed of 60 m/min, drying the same in an oven at a temperature of 55° C., and rolling up to obtain a ceramic coated membrane; and (6) coating the polymer slurry III onto both sides of the ceramic coated membrane simultaneously by the large coater, using the coating method of microgravure coating at a coating speed of 35 m/min, subjecting the resultant product to solidification in a solidification tank containing 85 parts of pure water and 15 parts of ethanol, to water washing in a washing tank containing pure water, and to polymer pore-forming, thereafter drying the same in the oven at a temperature of 60° C., and rolling up to obtain a ceramic-and-polymer-compositely-coated lithium ion separator.

The ceramic coating and the polymer coating of the prepared ceramic-and-polymer-compositely-coated lithium ion separator have a total coating thickness of 6.4 μm and a surface density of 7.8 g/m$^2$; and the entire compositely coated lithium ion separator has a thickness of 18.4 μm and a surface density of 14.2 g/m$^2$.

Embodiment 2

The present embodiment provides a ceramic-and-polymer-compositely-coated lithium ion separator, and the preparation method thereof is as follow:

(1) preparation of an aqueous binder emulsion:

1) adding 8 parts of sodium carboxymethyl cellulose to deionized water having a weight that is 10 times the weight of sodium carboxymethyl cellulose, and stirring the same evenly to obtain a sodium carboxymethyl cellulose aqueous solution;

2) adding 2.5 parts of rutile titanium dioxide, 0.35 parts of sodium dodecyl sulfate, and 15% of the total weight of the sodium carboxymethyl cellulose aqueous solution, which serve as a first input material, into deionized water having a weight that is 5 times the weight of the first input material, and stirring to disperse the same at a high speed of 2500 R/min for 55 min to obtain solution A;

3) adding 6 parts of butyl acrylate, 7 parts of ethyl acrylate, 4.5 parts of acrylic acid, and 0.25 parts of sodium dodecyl sulfate, which serve as a second input material, into deionized water having a weight that is 14 times the weight of the second input material, and stirring to evenly disperse the same to obtain solution B; and 4) heating solution A in a reactor to 75° C., adding thereto 0.35 parts of ammonium persulfate, introducing thereto a protective gas, dropwise adding solution B to solution A while stirring in such a manner that dropwise addition of solution B to solution A is finished within 30 min, stirring for 55 min with the temperature maintained, discharging the resultant product, cooling the same to normal temperature, and mixing, while stirring evenly, the same with 85% of the total weight of the sodium carboxymethyl cellulose aqueous solution, obtaining the aqueous binder emulsion.

(2) adding 36 parts of boehmite (with D50 of 1.06 μm and a specific surface area of 3.47 m$^2$/g), 6.2 parts of the aqueous binder emulsion, 3.1 parts of sodium carboxymethyl cellulose, 3.1 parts of styrene-butadiene rubber, 3.5 parts of the aqueous dispersant sulfonate fluorine dispersants, 0.5 parts of the aqueous wetting agent polyoxyethylene amide and 47.6 parts of pure water into a dispersion tank, ball-milling the same for 30 min in a ball mill at a rotational speed of 500 R/min for pre-dispersion, after the pre-dispersion is finished, pumping the same into a high-speed disperser for stirring for 90 min at a rotational speed of 6500 R/min, then pouring the resultant slurry into a plastic bucket, and filtering the same with a 300 mesh sieve, to obtain aqueous ceramic slurry I;

(3) placing 8 parts of ethanol, 7 parts of isopropyl alcohol, 2.5 parts of sodium polyacrylate, and 64 parts of dimethyl acetamide in an agitation tank, and stirring the same at 2500 R/min for 0.5 h to obtain mixed solution II;

(4) placing 18 parts of a copolymer P (VDF-HFP) powder of PVDF and hexafluoropropylene (HFP), and 0.5 parts of barium titanate (with D50 of 130 nm) in a dispersion tank, adding the mixed solution II thereto, ball-milling the same for 60 min in the ball mill at a rotational speed of 600 R/min for pre-dispersion, and after the pre-dispersion is finished, pumping the same into a high-speed disperser for stirring for 60 min at a rotational speed of 50000 R/min, to obtain polymer slurry III;

(5) coating the aqueous ceramic slurry I onto one side of a 16 μm wet method PP membrane by a large coater, using the coating method of microgravure coating at a coating speed of 40 m/min, drying the same in an oven at a temperature of 50° C., and rolling up to obtain a ceramic coated membrane; and (6) coating the polymer slurry III onto both sides of the ceramic coated membrane simultaneously by the large coater, using the coating method of curtain coating at a coating speed of 40 m/min, subjecting the resultant product to solidification in a solidification tank containing 90 parts of pure water, 5 parts of ethanol and 5 parts of methanol, to water washing in a washing tank containing pure water, and to polymer pore-forming, thereafter drying the same in the oven at a temperature of 55° C., and rolling up to obtain a ceramic-and-polymer-compositely-coated lithium ion separator.

The ceramic coating and the polymer coating of the ceramic-and-polymer-compositely-coated lithium ion separator prepared in embodiment 2 have a total coating thickness of 5.1 μm and a surface density of 6.9 g/m$^2$; and the entire compositely coated lithium ion separator has a thickness of 21.1 μm and a surface density of 17.4 g/m$^2$.

Embodiment 3

The present embodiment provides a ceramic-and-polymer-compositely-coated lithium ion separator, and the preparation method thereof is as follow:

(1) preparation of an aqueous binder emulsion:

1) adding 10 parts of sodium carboxymethyl cellulose to deionized water having a weight that is 18 times the weight of sodium carboxymethyl cellulose, and stirring the same evenly to obtain a sodium carboxymethyl cellulose aqueous solution;

2) adding 3.8 parts of rutile titanium dioxide, 0.15 parts of Triton X-100, and 18% of the total weight of the sodium carboxymethyl cellulose aqueous solution, which serve as a first input material, into deionized water having a weight that is 13 times the weight of the first input material, and stirring to disperse the same at a high speed of 3300 R/min for 35 min to obtain solution A;

3) adding 5 parts of butyl acrylate, 5 parts of ethyl acrylate, 8 parts of methyl methacrylate, 0.2 parts of Tritox X-100, and 0.3 parts of sodium dodecylbenzene sulfonate, which serve as a second input material, into deionized water having a weight that is 10 times the weight of the second input material, and stirring to evenly disperse the same to obtain solution B; and 4) heating solution A in a reactor to 60° C., adding thereto 0.35 parts of ammonium persulfate, introducing thereto a protective gas, dropwise adding solution B to solution A while stirring in such a manner that dropwise addition of solution B to solution A is finished within 37 min, stirring for 40 min with the temperature maintained, discharging the resultant product, cooling the same to normal temperature, and mixing, while stirring evenly, the same with 82% of the total weight of the sodium carboxymethyl cellulose aqueous solution, obtaining the aqueous binder emulsion.

(2) adding 30 parts of magnesium hydroxide (with D50 of 0.87 μm and a specific surface area of 7.1 m$^2$/g), 6.8 parts of the aqueous binder emulsion, 5 parts of styrene-acrylic latex, 1.8 parts of polyvinyl alcohol, 4.8 parts of the aqueous dispersant polyethylene glycol, 0.6 parts of the aqueous wetting agent polyoxyethylene alkyl amine and 51 parts of pure water into a dispersion tank, ball-milling the same for 45 min in a ball mill at a rotational speed of 750 R/min for pre-dispersion, after the pre-dispersion is finished, pumping the same into a high-speed disperser for stirring for 100 min at a rotational speed of 4500 R/min, then pouring the resultant slurry into a plastic bucket, and filtering the same with a 400 mesh sieve, to obtain aqueous ceramic slurry I;

(3) placing 12 parts of ethanol and 75 parts of dimethylformamide in an agitation tank, and stirring the same at 1500 R/min for 0.3 h to obtain mixed solution II;

(4) placing 13 parts of a copolymer P (VFD-HFP) powder of PVDF and hexafluoropropylene (HFP) in a dispersion tank, adding the mixed solution II thereto, ball-milling the same for 30 min in the ball mill at a rotational speed of 800 R/min, and after the pre-dispersion is finished, pumping the same into a high-speed disperser for stirring for 70 min at a rotational speed of 3500 R/min, to obtain polymer slurry III;

(5) coating the aqueous ceramic slurry I onto both sides of a 20 μm PE and PP composite three-layered membrane by a large coater, using the coating method of dip coating at a coating speed of 45 m/min, drying the same in an oven at a temperature of 55° C., and rolling up to obtain a ceramic coated membrane; and (6) coating the polymer slurry III onto both sides of the ceramic coated membrane simultaneously by the large coater, using the coating method of microgravure coating at a coating speed of 55 m/min, subjecting the resultant product to solidification in a solidification tank containing 90 parts of pure water and 10 parts of ethanol, to water washing in a washing tank containing pure water, and to polymer pore-forming, thereafter drying the same in the oven at a temperature of 60° C., and rolling up to obtain a ceramic-and-polymer-compositely-coated lithium ion separator.

The ceramic coating and the polymer coating of the ceramic-and-polymer-compositely-coated lithium ion separator prepared in embodiment 3 have a total coating thickness of 4.7 μm and a surface density of 5.5 g/m$^2$; and the entire compositely coated lithium ion separator has a thickness of 24.7 μm and a surface density of 17.2 g/m$^2$.

Embodiment 4

The present embodiment provides a ceramic-and-polymer-compositely-coated lithium ion separator, and the preparation method thereof is as follow:

(1) preparation of an aqueous binder emulsion:

1) adding 4.8 parts of sodium carboxymethyl cellulose to deionized water having a weight that is 14.5 times the weight of sodium carboxymethyl cellulose, and stirring the same evenly to obtain a sodium carboxymethyl cellulose aqueous solution;

2) adding 1.5 parts of barium titanate powder, 2.5 parts of rutile titanium dioxide, 0.31 parts of sodium dodecyl sulfate, and 25% of the total weight of the sodium carboxymethyl cellulose aqueous solution, which serve as a first input material, into deionized water having a weight that is 15.5 times the weight of the first input material, and stirring to disperse the same at a high speed of 2800 R/min for 48 min to obtain solution A;

3) adding 6 parts of butyl acrylate, 6 parts of methyl methacrylate, 3 parts of N-hydroxymethyl acrylamide, 0.26 parts of sodium dodecyl sulfate, and 0.15 parts of sodium dodecylbenzene sulfonate, which serve as a second input material, into deionized water having a weight that is 13 times the weight of the second input material, and stirring to evenly disperse the same to obtain solution B; and 4) heating solution A in a reactor to 80° C., adding thereto 0.33 parts of ammonium persulfate, introducing thereto a protective gas, dropwise adding solution B to solution A while stirring in such a manner that dropwise addition of solution B to solution A is finished within 55 min, stirring for 38 min with the temperature maintained, discharging the resultant product, cooling the same to normal temperature, and mixing, while stirring evenly, the same with 75% of the total weight of the sodium carboxymethyl cellulose aqueous solution, obtaining the aqueous binder emulsion.

(2) adding 40 parts of aluminum oxide (with D50 of 1.1 μm and a specific surface area of 3.3 m$^2$/g), 6.5 parts of the aqueous binder emulsion, 6.5 parts of the aqueous binder poly(ethyl acrylate), 6.5 parts of the aqueous dispersant sodium dibutylnaphthalenesulfonate, 0.46 parts of the aqueous wetting agent polyoxyethylene amide and 40.04 parts of pure water into a dispersion tank, ball-milling the same for 30 min in a ball mill at a rotational speed of 1200 R/min for pre-dispersion, after the pre-dispersion is finished, pumping the same into a high-speed disperser for stirring for 900 min at a rotational speed of 4700 R/min, then pouring the resultant slurry into a plastic bucket, and filtering the same with a 300 mesh sieve, to obtain aqueous ceramic slurry I;

(3) placing 5 parts of ethanol, 5 parts of pure water, 0.8 parts of potassium polyacrylate, and 79 parts of dimethyl sulfoxide in an agitation tank, and stirring the same at 1000 R/min for 0.5h to obtain mixed solution II;

(4) placing 9 parts of a copolymer P (VDF-HFP) powder of PVDF and hexafluoropropylene (HFP), and 1.2 parts of sodium niobate in a dispersion tank, adding the mixed solution II thereto, ball-milling the same for 45 min in the ball mill at a rotational speed of 750 R/min for pre-dispersion, and after the pre-dispersion is finished, pumping the same into a high-speed disperser for stirring for 40 min at a rotational speed of 6500 R/min, to obtain polymer slurry III;

(5) coating the aqueous ceramic slurry I onto one side of a 16 μm PE and PP composite three-layered membrane by a large coater, using the coating method of dip coating at a coating speed of 52 m/min, drying the same in an oven at a temperature of 65° C., and rolling up to obtain a ceramic coated membrane; and (6) coating the polymer slurry III onto both sides of the ceramic coated membrane simultaneously by the large coater, using the coating method of spray coating at a coating speed of 42 m/min, subjecting the resultant product to solidification in a solidification tank containing 100 parts of pure water, to water washing in a washing tank containing pure water, and to polymer pore-forming, thereafter drying the same in the oven at a temperature of 55° C., and rolling up to obtain a ceramic-and-polymer-compositely-coated lithium ion separator.

The ceramic coating and the polymer coating of the ceramic-and-polymer-compositely-coated lithium ion separator prepared in embodiment 4 have a total coating thickness of 5.3 μm and a surface density of 6.3 g/m$^2$; and the entire compositely coated lithium ion separator has a thickness of 21.3 μm and a surface density of 16.8 g/m².

Embodiment 5

Embodiment 5 differs from Embodiment 2 in step (5) in which when the aqueous ceramic slurry I is coated onto one side of a 2 μm wet method PP membrane by a large coater, the coating method is dip coating and the coating speed is 35 m/min, and the resultant product is dried in an oven at a temperature of 45° C. and then rolled up to obtain a ceramic coated membrane The ceramic coating and the polymer coating of the ceramic-and-polymer-compositely-coated lithium ion separator prepared in embodiment 5 have a total coating thickness of 1.5 μm and a surface density of 3 g/m²; and the entire compositely coated lithium ion separator has a thickness of 3.5 μm and a surface density of 3 g/m².

Embodiment 6

Embodiment 6 differs from Embodiment 5 in step (5) in which when the aqueous ceramic slurry I is coated onto both sides of a 50 μm PE and PP composite three-layered membrane by a large coater, the coating method is dip coating and the coating speed is 75 m/min, and the resultant product is dried in an oven at a temperature of 65° C. and then rolled up to obtain a ceramic coated membrane The ceramic coating and the polymer coating of the ceramic-and-polymer-compositely-coated lithium ion separator prepared in embodiment 6 have a total coating thickness of 18 μm and a surface density of 15 g/m²; and the entire compositely coated lithium ion separator has a thickness of 68 μm and a surface density of 50 g/m².

Embodiment 7

Embodiment 7 differs from embodiment 1 in that: in embodiment 7, the method for preparing an aqueous binder emulsion is, in parts by weight:
1) adding 7 parts of sodium carboxymethyl cellulose to deionized water having a weight that is 5 times the weight of sodium carboxymethyl cellulose, and stirring the same evenly to obtain a sodium carboxymethyl cellulose aqueous solution;
2) adding 1 part of potassium niobate powder, 1 part of sodium niobate powder, 0.8 parts of sodium dodecylbenzene sulfonate, and 10% of the total weight of the sodium carboxymethyl cellulose aqueous solution, which serve as a first input material, into deionized water having a weight that is 6 times the weight of the first input material, and stirring to disperse the same at a high speed of 2500 R/min for 60 min to obtain solution A;
3) adding 6 parts of N-hydroxymethyl acrylamide, 9 parts of glycidyl methacrylate, 0.4 parts of lauryl glucoside, and 0.4 parts of sodium fatty alcohol polyoxyethylene ether sulfate, which serve as a second input material, into deionized water having a weight that is 12 times the weight of the second input material, and stirring to evenly disperse the same to obtain solution B; and
4) heating solution A in a reactor to 80° C., adding thereto 0.3 parts of ammonium persulfate, introducing thereto a protective gas, dropwise adding solution B to solution A while stirring in such a manner that dropwise addition of solution B to solution A is finished within 30 min, stirring for 50 min with the temperature maintained, discharging the resultant product, cooling the same to normal temperature, and mixing, while stirring evenly, the same with 90% of the total weight of the sodium carboxymethyl cellulose aqueous solution, obtaining the aqueous binder emulsion, and In embodiment 7, the method for preparing the aqueous ceramic slurry I is, in parts by weight: adding 20 parts of magnesium oxide and 20 parts of boehmite, serving as the ceramic powder (with D50 of 1.1 μm and a specific surface area of 3.3 m²/g), 5 parts of the aqueous binder emulsion, 6 parts of the aqueous binder styrene-acrylic latex, 5 parts of the aqueous dispersant sodium dibutylnaphthalenesulfonate, 0.4 parts of the wetting agent sodium alkyl polyoxyethylene ether carboxylate and 45 parts of pure water into a dispersion tank, ball-milling the same for 30 min in a ball mill at a rotational speed of 1200 R/min for pre-dispersion, after the pre-dispersion is finished, pumping the same into a high-speed disperser for stirring for 900 min at a rotational speed of 4700 R/min, then pouring the resultant slurry into a plastic bucket, and filtering the same with a 300 mesh sieve, thereby obtaining the aqueous ceramic slurry I.

Embodiment 8

Embodiment 8 differs from embodiment 2 in that: in embodiment 8, the method for preparing an aqueous binder emulsion is, in parts by weight:
1) adding 6 parts of sodium carboxymethyl cellulose to deionized water having a weight that is 12 times the weight of sodium carboxymethyl cellulose, and stirring the same evenly to obtain a sodium carboxymethyl cellulose aqueous solution;
2) adding 1 part of $BaTiO_3$-$Nb_2O_5$—ZnO powder, 1 part of barium titanate powder, 0.8 parts of sodium dodecylbenzene sulfonate, and 10% of the total weight of the sodium carboxymethyl cellulose aqueous solution, which serve as a first input material, into deionized water having a weight that is 12 times the weight of the first input material, and stirring to disperse the same at a high speed of 2800 R/min for 50 min to obtain solution A;
3) adding 6 parts of N-hydroxymethyl acrylamide, 9 parts of glycidyl methacrylate, 0.4 parts of lauryl glucoside, and 0.4 parts of sodium fatty alcohol polyoxyethylene ether sulfate, which serve as a second input material, into deionized water having a weight that is 15 times the weight of the second input material, and stirring to evenly disperse the same to obtain solution B; and
4) heating solution A in a reactor to 70° C., adding thereto 0.3 parts of ammonium persulfate, introducing thereto a protective gas, dropwise adding solution B to solution A while stirring in such a manner that dropwise addition of solution B to solution A is finished within 40 min, stirring for 40 min with the temperature maintained, discharging the resultant product, cooling the same to normal temperature, and mixing, while stirring evenly, the same with 90% of the total weight of the sodium carboxymethyl cellulose aqueous solution, obtaining the aqueous binder emulsion, and In embodiment 8, the method for preparing the aqueous ceramic slurry I is, in parts by weight: adding 20 parts of magnesium oxide and 20 parts of boehmite, serving as the ceramic powder (with D50 of 1.1 μm and a specific surface area of 3.3 m²/g). 5 parts of the aqueous binder emulsion, 6 parts of the aqueous binder styrene-acrylic latex, 5 parts of the aqueous dispersant sodium dibutylnaphthalenesulfonate, 0.4 parts of the wetting agent sodium alkyl polyoxyethylene ether carboxylate and 45 parts of pure water into a dispersion tank, ball-milling the same for 30 min in a ball mill at a rotational speed of 1500 R/min for pre-dispersion, after the pre-dispersion is finished, pumping the same into a high-speed disperser for stirring for 70 min at a rotational speed of 6000 R/min, then pouring the resultant slurry into a plastic bucket, and filtering the same with a 300 mesh sieve, thereby obtaining the aqueous ceramic slurry I.

Embodiment 9

Embodiment 9 differs from embodiment 3 in that: in embodiment 9, the method for preparing an aqueous binder emulsion is, in parts by weight:

1) adding 10 parts of sodium carboxymethyl cellulose to deionized water having a weight that is 20 times the weight of sodium carboxymethyl cellulose, and stirring the same evenly to obtain a sodium carboxymethyl cellulose aqueous solution;

2) adding 1 part of barium titanate powder, 1 part of sodium niobate powder, 1 part of rutile titanium dioxide powder, 0.6 parts of sodium benzenesulfonate, and 20% of the total weight of the sodium carboxymethyl cellulose aqueous solution, which serve as a first input material, into deionized water having a weight that is 6 times the weight of the first input material, and stirring to disperse the same at a high speed of 3200 R/min for 40 min to obtain solution A;

3) adding 5 parts of 2-ethylhexyl acrylate, 5 parts of hydroxyethyl methacrylate, 5 parts of hydroxypropyl methacrylate, 5 parts of butyl acrylate, 0.3 parts of sodium dodecyl sulfate, and 0.5 parts of betaine hydrochloride, which serve as a second input material, into deionized water having a weight that is 10 times the weight of the second input material, and stirring to evenly disperse the same to obtain solution B; and 4) heating solution A, placed in a reactor, to 75° C., adding thereto 0.3 parts of ammonium persulfate, introducing thereto a protective gas, dropwise adding solution B to solution A while stirring in such a manner that dropwise addition of solution B to solution A is finished within 35 min, stirring for 40 min with the temperature maintained, discharging the resultant product, cooling th80% of the total weight of the sodium carboxymethyl cellulose aqueous solution, obtaining the aqueous binder emulsion.

In embodiment 9, the method for preparing the aqueous ceramic slurry I is, in parts by weight: adding 15 parts of zirconium dioxide, 15 parts of barium titanate and 15 parts of zinc oxide, serving as the ceramic powder (with D50 of 0.8 μm and a specific surface area of 7.8 m²/g), 5 parts of the aqueous binder emulsion, 3 parts of the aqueous binder sodium alginate, 3 parts of the aqueous binder polyacrylic acid, 2 parts of the aqueous dispersant sodium dibutylnaphthalenesulfonate, 2 parts of the aqueous dispersant polyacrylamide, 0.4 parts of the wetting agent alkyl polyoxyethylene amide and 50 parts of pure water into a dispersion tank, ball-milling the same for 60 min in a ball mill at a rotational speed of 1800 R/min for pre-dispersion, after the pre-dispersion is finished, pumping the same into a high-speed disperser for stirring for 90 min at a rotational speed of 4200 R/min, then pouring the resultant slurry into a plastic bucket, and filtering the same with a 300 mesh sieve, thereby obtaining the aqueous ceramic slurry I.

Embodiment 10

Embodiment 10 differs from embodiment 3 in that: in embodiment 10, the method for preparing polymer slurry III is:

(3) placing 8 parts of methyl acetate, 8 parts of pure water, 0.8 parts of sodium dibutylnaphthalenesulfonate, 35 parts of N-methylpyrrolidone and 30 parts of sulfolane in an agitation tank, and stirring the same at 1800 R/min for 1.5 h to obtain mixed solution II; and (4) placing 5 parts of polyacrylonitrile, 5 parts of polyoxyethylene and 2 parts of rutile titanium dioxide in a dispersion tank, adding the mixed solution II thereto, ball-milling the same for 45 min in the ball mill at a rotational speed of 750 R/min for pre-dispersion, and after the pre-dispersion is finished, pumping the same into a high-speed disperser for stirring for 40 min at a rotational speed of 6500 R/min, thereby obtaining polymer slurry III.

Embodiment 11

Embodiment 11 differs from embodiment 4 in that: in embodiment 11, the method for preparing polymer slurry III is:

(3) placing 5 parts of lithium chloride, 5 parts of polyethylene glycol, 15 parts of pure water, 1.5 parts of polyethylene glycol fatty acid ester, 40 parts of dimethyl acetamide and 40 parts of dichloroethane in an agitation tank, and stirring the same at 1500 R/min for 1.2 h to obtain mixed solution II; and (4) placing 6 parts of polyacrylonitrile, 10 parts of polyoxyethylene and 3 parts of barium titanate in a dispersion tank, adding the mixed solution II thereto, ball-milling the same for 35 min in the ball mill at a rotational speed of 1250 R/min for pre-dispersion, and after the pre-dispersion is finished, pumping the same into a high-speed disperser for stirring for 50 min at a rotational speed of 4000 R/min, thereby obtaining polymer slurry III.

Comparative Embodiment 1

An existing PE membrane was used as the base membrane, having a thickness of 22 μm.

Comparative Embodiment 2

An existing PP membrane was used as the base membrane, having a thickness of 16 μm.

Figure 1:
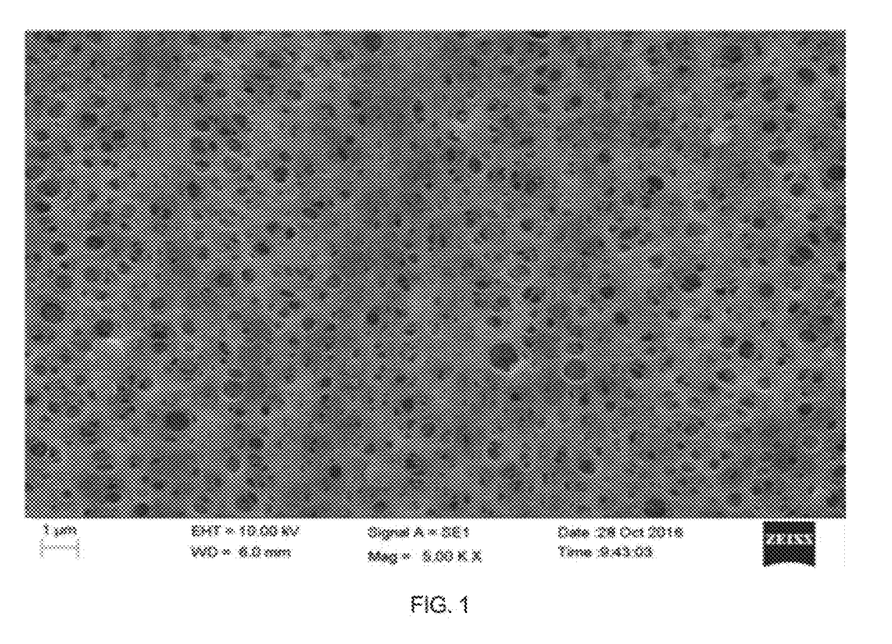
FIG. 1 is a scanning electron microscope image of a surface of a ceramic-and-polymer-compositely-coated lithium ion separator synthesized according to embodiment 1.
Figure 2:
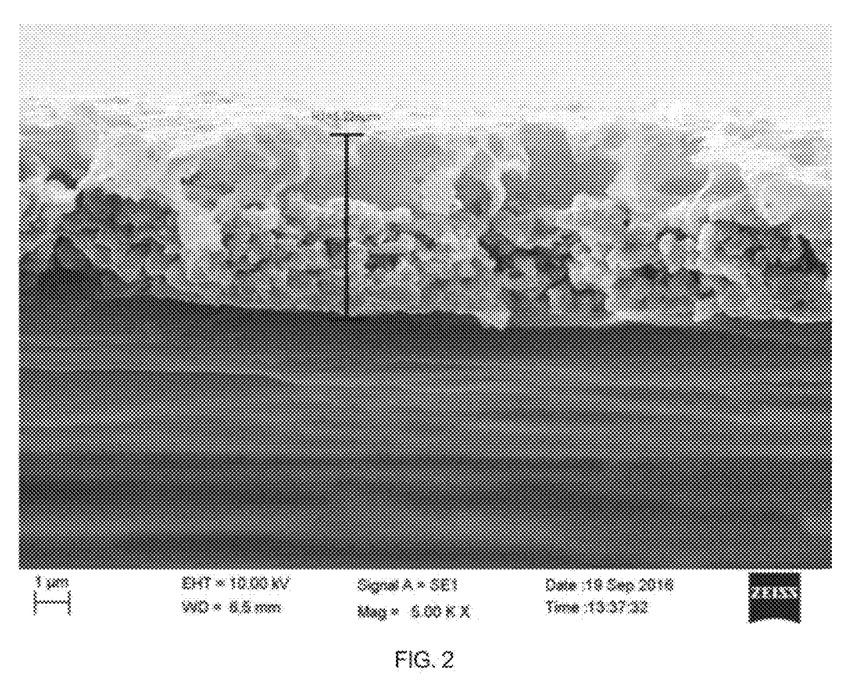
FIG. 2 is a scanning electron microscope image of a cross section (at the PE, ceramic and polymer side) of the ceramic-and-polymer-compositely-coated lithium ion separator synthesized according to embodiment 1.
Figure 3:
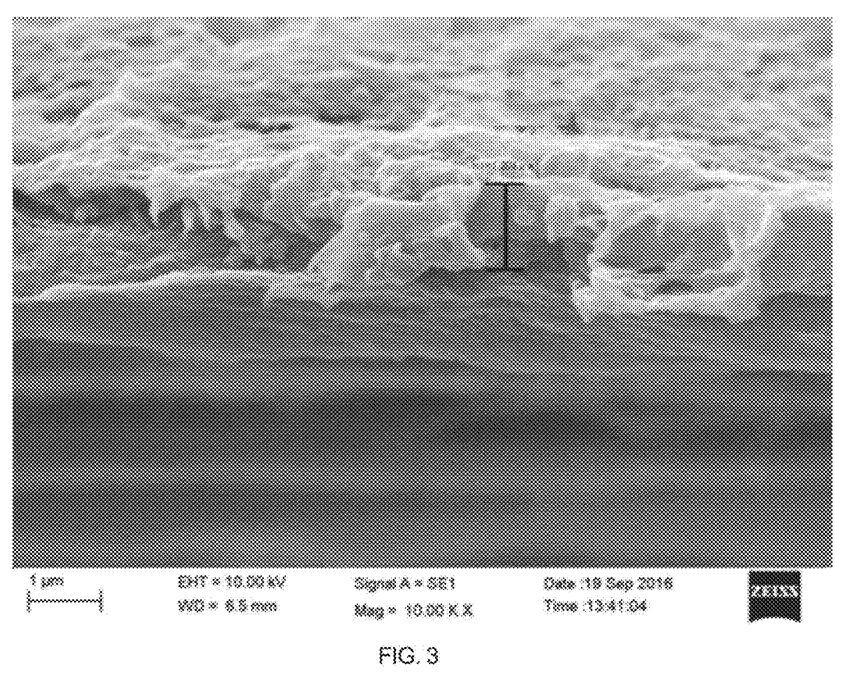
FIG. 3 is a scanning electron microscope image of a cross section (at the PE and polymer side) of the ceramic-and-polymer-compositely-coated lithium ion separator synthesized according to embodiment 1.

Electron microscope scanning was conducted on the surface of the ceramic-and-polymer-compositely-coated lithium ion separator prepared in embodiment 1 of the present disclosure, on the cross section of the surface on one side thereof with PE, ceramic and polymer and on the cross section of the surface on one side thereof with PE and polymer, as shown in FIG. 1, FIG. 2 and FIG. 3, respectively. As can be seen, for the composite separator prepared in embodiment 1, the ceramic coating and the polymer coating have even coating thickness, and the uniformity of thickness distribution is high; moreover, the distribution of pores in the composite separator is also very even.

Figure 4:
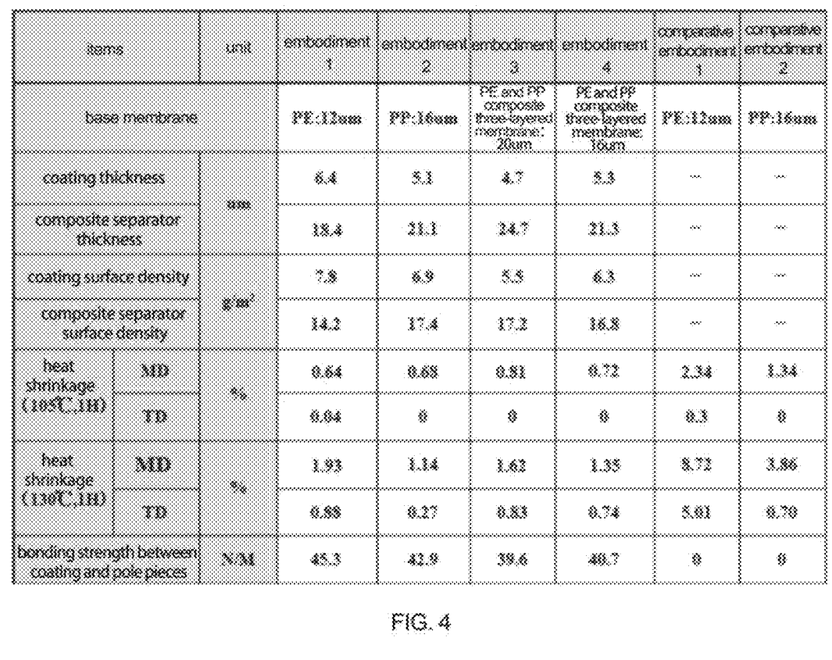
FIG. 4 shows heat shrinkage data, and data of interfacial bonding strength between the coating and pole pieces and the compositely coated separator (under the test conditions: temperature: 90° C., pressure: 5 Mpa, duration: 1 min, the pole pieces being lithium cobalt oxide pole pieces) of ceramic-and-polymer-compositely-coated lithium ion separators synthesized according to embodiments 1, 2, 3 and 4 and base membranes of comparative embodiments.

Test was conducted on the properties of the ceramic-and-polymer-compositely-coated lithium ion separators synthesized in embodiment 1, embodiment 2, embodiment 3 and embodiment 4, the base membrane provided in comparative embodiment 1 and the base membrane provided in comparative embodiment 2 (test conditions: temperature: 90° C., pressure: 5 Mpa, duration: 1 min, the pole pieces being lithium cobalt oxide pole pieces). The data are shown in the table of FIG. 4. Compared with the uncoated base membranes provided in comparative embodiment 1 and comparative embodiment 2, for the ceramic-and-polymer-compositely-coated lithium ion separators made in embodiment 1, embodiment 2, embodiment 3 and embodiment 4 of the present disclosure, the heat shrinkage value is significantly reduced, the 130° C./1H heat shrinkage value is reduced from 3.86% of the 16 μm PP base membrane of comparative embodiment 2 to 1.14% of the ceramic-and-polymer-compositely-coated separator of embodiment 2; and the interfacial bonding force between the ceramic-and-polymer-compositely-coated separator provided in each of embodiments 1-4 and the lithium cobalt oxide pole pieces under the conditions of 90° C., 5 Mpa and 1 min dry pressing reaches 39 N/m or above, which can meet the requirements of power batteries and digital consumer batteries for the interfacial bonding force between the composite separator and the pole pieces.

Figure 5:
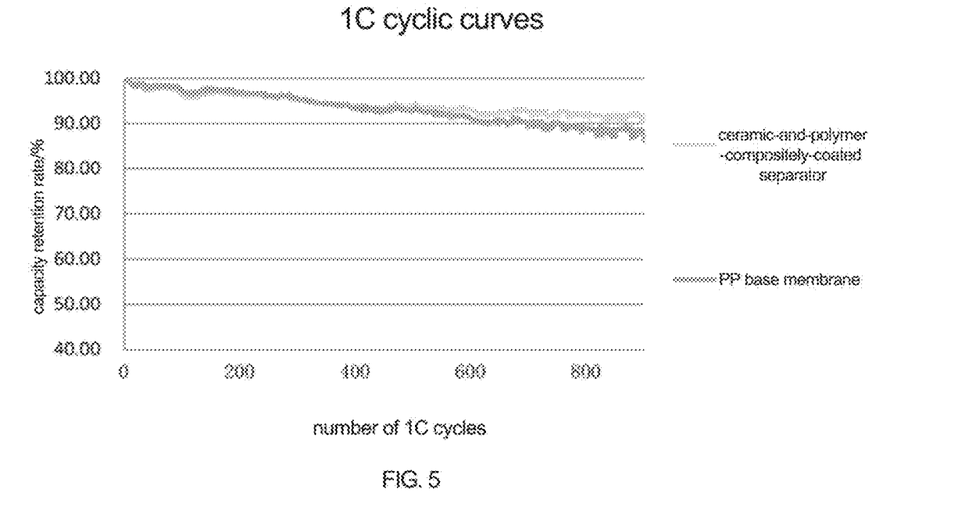
FIG. 5 shows cyclic curves of pouch-type batteries, made using the ceramic-and-polymer-compositely-coated lithium ion separator synthesized according to embodiment 1 and using a PP base membrane respectively under the same conditions and with the same process, under 1C charging and discharging condition.

In addition, test was conducted on the cyclic curves of pouch-type batteries, made using the ceramic-and-polymer-compositely-coated lithium ion separator prepared according to the embodiments and using the PP base membrane provided in comparative embodiment 2, respectively, under the same conditions and with the same process, under 1C charging and discharging conditions. The results are shown in FIG. 5, in which the battery prepared with the ceramic-and-polymer-compositely-coated separator provided in embodiment 1 has superior electrochemical performance, as the battery capacity is still maintained at 90% or above after 900 cycles of 1C charging and discharging, while the battery capacity retention rate of the battery prepared with the PP base membrane is 87.9% after 900 cycles of charging and discharging. Thus, the ceramic-and-polymer-compositely-coated separator provided in the present disclosure has superior electrochemical performance.

The above is detailed description of the present disclosure, which helps to understand the present disclosure. However, the implementation mode of the present disclosure is not limited to the above embodiments. Any changes, modifications, substitutions, combinations and simplifications made without departing from the principle of the present disclosure shall be equivalent replacement and shall be covered by the scope of protection of the present disclosure.

INDUSTRIAL APPLICABILITY

The ceramic-and-polymer-compositely-coated lithium ion separator provided by the present disclosure has the advantages of high heat resistance and high bonding strength with the positive and negative pole pieces, and can also improve the wettability of an electrolyte, prevent an internal short circuit due to layer dislocation between the composite separator and the electrodes and improve hardness and safety performance of the battery. In addition, in the present disclosure, a high dielectric constant ceramic material is innovatively added to the polymer coating, which greatly improves the $Li^+$ ion conductivity of the polymer coating, thereby improving the charging and discharging performance of the battery using the composite separator. The method for preparing a ceramic-and-polymer-compositely-coated lithium ion separator provided by the present disclosure is favorable for continuous and large-scale production.

The invention claimed is:

1. A ceramic-and-polymer-compositely-coated lithium ion separator having bonding strength with pole pieces of at least 39N/M, and comprising:
a polyolefin porous membrane, a ceramic coating coated onto one or both sides of the membrane surface, and a polymer coating coated onto the ceramic surface or the membrane surface, wherein
the ceramic coating is made by following raw materials in parts by weight: 15-45 parts of a ceramic material, 0.5-8 parts of an aqueous dispersant, 1-10 parts of an aqueous binder, 1-5 parts of an aqueous binder emulsion, and 0.1-5 parts of an aqueous wetting agent, wherein
the aqueous binder emulsion is composed of following raw materials in parts by weight: 1-10 parts of sodium carboxymethyl cellulose, 1.5-5 parts of a high dielectric constant ceramic material, 5-20 parts of a monomer for synthesis of acrylic resin, 0.1-0.5 parts of ammonium persulfate, and 0.2-2 parts of a surfactant, and
the high dielectric constant ceramic material in the aqueous binder emulsion is at least one selected from the group consisting of rutile titanium dioxide, barium titanate, potassium niobate and sodium niobate, and wherein a total surface density of the ceramic-and-polymer-compositely-coated lithium ion separator is 3-50 $g/m^2$.

2. The ceramic-and-polymer-compositely-coated lithium ion separator according to claim 1, wherein the polyolefin porous membrane is one selected from the group consisting of a dry method polypropylene (PP) membrane, a wet method polyethylene (PE) membrane and a PE and PP composite three-layered membrane, and the polyolefin porous membrane has a thickness of 2-50 μm, and the polyolefin porous membrane has a porosity of 20%-70%.

3. The ceramic-and-polymer-compositely-coated lithium ion separator according to claim 1, wherein the ceramic coating has a thickness of 1-10 μm, and the polymer coating has a thickness of 0.5-8 μm.

4. The ceramic-and-polymer-compositely-coated lithium ion separator according to claim 1, wherein the ceramic coating and the polymer coating form a total coating thickness of 1.5-18 μm, and the ceramic coating and the polymer coating form a total coating which has a surface density of 3-15 $g/m^2$, and a total thickness of the ceramic-and-polymer-compositely-coated lithium ion separator is 3.5-68 μm.

5. The ceramic-and-polymer-compositely-coated lithium ion separator according to claim 1, wherein the ceramic material is at least one selected from the group consisting of aluminum oxide, silicon dioxide, magnesium hydroxide, rutile titanium dioxide, magnesium oxide, boehmite, zirconium dioxide, barium titanate and zinc oxide, and the D50 of particles of the ceramic material is 20-2000 nm, and a specific surface area of the ceramic material is 0.8-200 $m^2/g$.

6. The ceramic-and-polymer-compositely-coated lithium ion separator according to claim 5, wherein the aqueous binder is at least one selected from the group consisting of polyvinylidene fluoride, polyvinyl alcohol, styrene-butadiene rubber, sodium carboxymethyl cellulose, styrene-acrylic latex, pure styrene latex, sodium alginate and polyacrylic acid, and the aqueous dispersant is at least one selected from the group consisting of sodium polyacrylate, polyethylene glycol, sodium dodecyl sulfate, carboxylate fluorine dispersants, sodium dibutylnaphthalenesulfonate, sulfonate fluorine dispersants, potassium polyacrylate, polyacrylamide, polyethylene glycol fatty acid ester and sodium carboxymethyl cellulose, and the aqueous wetting agent is at least one selected from the group consisting of sodium polyacrylate, polyvinyl alcohol, sodium alkyl polyoxyethylene ether carboxylate, alkylphenol polyoxyethylene ether, sodium alkyl benzene sulfonate, alkyl phenol polyoxyethylene ether, polyoxyethylene alkyl amine and polyoxyethylene amide.

7. The ceramic-and-polymer-compositely-coated lithium ion separator according to claim 1, wherein the surfactant is at least one selected from the group consisting of carboxylate, sodium benzenesulfonate, sodium dodecylbenzene sulfonate, sodium fatty alcohol polyoxyethylene ether sulfate, Triton X-100, quaternary ammonium salts, lauryl glucoside, sodium dodecyl sulfate and betaine salts, and the monomer for synthesis of acrylic resin is at least one selected from the group consisting of methyl acrylate, ethyl acrylate, butyl acrylate, methyl methacrylate, butyl methacrylate, 2-ethylhexyl acrylate, ethyl methacrylate, acrylic acid, hydroxyethyl methacrylate, hydroxyethyl acrylate, N-hydroxymethyl acrylamide, hydroxypropyl acrylate, glycidyl acrylate, methacrylic acid, hydroxypropyl methacrylate and glycidyl methacrylate.

8. The ceramic-and-polymer-compositely-coated lithium ion separator according to claim 1, wherein the polymer coating is made of following raw materials in parts by weight: 0-5 parts of a high dielectric constant ceramic material, 0-2 parts of a binder, 3-20 parts of a polymer, 2-20 parts of a pore-forming agent, 0-5 parts of a dispersant and 48-92 parts of a solvent.

9. The ceramic-and-polymer-compositely-coated lithium ion separator according to claim 8, wherein the polymer is at least one selected from the group consisting of a polyvinylidene fluoride (PDVF) homopolymer, a copolymer of PVDF and hexafluoropropylene, polyacrylonitrile, polyoxyethylene and polymethacrylate, and the polymer has a molecular weight of 50000-1200000, and the pore-forming agent is at least one selected from the group consisting of polyethylene glycol, polyvinylpyrrolidone, pure water, acetone, methyl acetate, methanol, isopropanol, ethanol, methanoic acid, acetic acid, propionic acid, n-butyl alcohol, n-octyl alcohol, lauryl alcohol, lithium chloride and lithium perchlorate, and the solvent is at least one selected from the group consisting of dimethyl acetamide, dichloroethane, dimethylformamide, trichloroethane, sulfolane, dimethyl sulfoxide, N-methylpyrrolidone, chloroform, dichloromethane and acetone; the binder is at least one selected from the group consisting of polyvinylidene fluoride, polyvinyl alcohol, styrene-butadiene rubber, sodium carboxymethyl cellulose, styrene-acrylic latex, pure styrene latex, sodium alginate and polyacrylic acid; the dispersant is at least one selected from the group consisting of sodium polyacrylate, polyethylene glycol, sodium dodecyl sulfate, carboxylate fluorine dispersants, sodium dibutylnaphthalenesulfonate, sulfonate fluorine dispersants, potassium polyacrylate, polyacrylamide, polyethylene glycol fatty acid ester and sodium carboxymethyl cellulose.

10. A method for preparing the ceramic-and-polymer-compositely-coated lithium ion separator of claim 1, comprising steps of:
(1) coating an aqueous ceramic slurry I onto one or both sides of a dry-method PP membrane, a wet-method PE membrane or a PE and PP composite three-layered membrane, and drying to obtain a ceramic coated membrane; and
(2) coating a polymer slurry III onto both sides of the ceramic coated membrane, subjecting to solidification, water washing and polymer pore-forming, and then drying.

11. The method for preparing a ceramic-and-polymer-compositely-coated lithium ion separator according to claim 10, wherein a method for preparing the aqueous ceramic slurry I comprises: mixing 15-45 parts by weight of a ceramic material, 0.5-8 parts by weight of an aqueous dispersant, 1-10 parts by weight of an aqueous binder, 1-5 parts by weight of an aqueous binder emulsion, 0.1-5 parts by weight of an aqueous wetting agent and pure water, subjecting to pre-dispersion by a ball mill and dispersion by a high-speed disperser, and then filtering with a 200-500 mesh sieve.

12. The method for preparing a ceramic-and-polymer-compositely-coated lithium ion separator according to claim 11, wherein a method for preparing the aqueous binder emulsion comprises steps of:
(1) adding 1-10 parts by weight of sodium carboxymethyl cellulose to deionized water having a weight 5-20 times the weight of sodium carboxymethyl cellulose, and stirring evenly to obtain a sodium carboxymethyl cellulose aqueous solution;
(2) adding 0-5 parts by weight of a high dielectric constant ceramic material, 0.1-1 parts by weight of a surfactant and 8-30% of total weight of the sodium carboxymethyl cellulose aqueous solution, which serve as a first input material, into to deionized water having a weight 5-20 times the weight of the first input material, and stirring to disperse to obtain solution A;
(3) adding 5-20 parts by weight of a monomer for synthesis of acrylic resin and 0.1-1 parts by weight of a surfactant, which serve as a second input material, into deionized water having a weight 5-20 times the weight of the second input material, and stirring to disperse evenly to obtain solution B; and
(4) heating the solution A to 60-80° C., adding thereto 0.1-0.5 parts by weight of ammonium persulfate, introducing thereto a protective gas, dropwise adding the solution B to the solution A while stirring, stirring for 10-60 min with the temperature maintained, discharging, cooling to a normal temperature, and mixing, while stirring evenly, with 70-92% of total weight of the sodium carboxymethyl cellulose aqueous solution.

13. The method for preparing a ceramic-and-polymer-compositely-coated lithium ion separator according to claim 12, wherein in step (2), the stirring to disperse is at 2000-3500 R/min for 30-60 min, and in step (4), the dropwise addition of the solution B to the solution A is finished within 10-60 min.

14. The method for preparing a ceramic-and-polymer-compositely-coated lithium ion separator according to claim 12, wherein a method for preparing the polymer slurry III comprises:
mixing, while stirring, 2-20 parts by weight of a pore-forming agent, 0-2 parts by weight of a binder, 0-5 parts by weight of a dispersant and 48-92 parts by weight of a solvent to obtain mixed solution II;
mixing 3-20 parts by weight of a polymer with 0-5 parts by weight of a high dielectric constant ceramic material and then adding to the mixed solution II, and thereafter sequentially subjecting to pre-dispersion by a ball mill and dispersion by a high-speed dispersion machine.

15. The method for preparing a ceramic-and-polymer-compositely-coated lithium ion separator according to claim 14, wherein the mixing while stirring is performed at a rotational speed of 500-5000 R/min for 0.2-1.2 h.

16. The method for preparing a ceramic-and-polymer-compositely-coated lithium ion separator according to claim 11, wherein the pre-dispersion by a ball mill performed by stirring for 0.1-1.5 h in a ball mill having a rotational speed of 200-2500 R/min, and the dispersion by a high-speed disperser is a high-speed stirring at a rotational speed of 500-9000 R/min for 0.3-2 h.

17. The method for preparing a ceramic-and-polymer-compositely-coated lithium ion separator according to claim 10, wherein the coating is carried out by a coater at a coating speed of 25-85 m/min, and the coating is one selected from the group consisting of dip coating, slide coating, curtain coating, microgravure coating and spray coating, and the drying is at a temperature of 35-78° C., and the solidification refers to passing through a solidification tank containing 60-100 wt % of pure water and 0-40 wt % of an alcohol, wherein the alcohol is at least one selected from the group consisting of ethanol, methanol, isopropanol and ethylene glycol; and the water washing refers to passing through a washing tank containing pure water.

18. The ceramic-and-polymer-compositely-coated lithium ion separator according to claim 2, wherein the ceramic coating has a thickness of 1-10 μm, and the polymer coating has a thickness of 0.5-8 μm.

* * * * *